United States Patent [19]

Geary

[11] Patent Number: 4,502,809

[45] Date of Patent: Mar. 5, 1985

[54] METHOD AND APPARATUS FOR CONTROLLING THERMAL GROWTH

[75] Inventor: Carl H. Geary, Greensburg, Pa.

[73] Assignee: Carrier Corporation, Syracuse, N.Y.

[21] Appl. No.: 297,798

[22] Filed: Aug. 31, 1981

[51] Int. Cl.³ .............................................. F16D 3/00
[52] U.S. Cl. ...................................... 403/28; 403/337
[58] Field of Search ................ 403/337, 28, 29, 30, 403/335, 309; 308/2 A; 464/98, 100, 92, 78; 415/134, 135

[56] References Cited

U.S. PATENT DOCUMENTS

| 2,638,743 | 5/1953 | Feildeu | 415/134 X |
|---|---|---|---|
| 2,931,092 | 4/1960 | Humphrey | 308/2 A |
| 3,138,012 | 6/1964 | Smirl | 464/92 |
| 3,169,749 | 2/1965 | Harris | 415/135 X |
| 4,008,000 | 2/1977 | Gradl et al. | 416/214 A |
| 4,189,282 | 2/1980 | Benoist et al. | 416/221 |

OTHER PUBLICATIONS

IBM Technical Disclosure Bulletin, vol. 19, No. 11, Apr. 1977, "Frictionless Axial Movement" W. W. Gardner.

Primary Examiner—Andrew V. Kundrat
Attorney, Agent, or Firm—Robert P. Hayter

[57] ABSTRACT

Differential thermal growth between joined flanged members is accommodated by making proximate pairs of axially extending sawcuts through the flange and into the casings to form elongated tabs which define sawcut springs. By joining the flanged members at the location of some of the sawcut springs, the springs deflect to permit differential thermal growth. Additionally, the flanged members can be maintained in a centered position, even under conditions of thermal growth, by centering the member by means of a plurality of circumferentially spaced jackscrews which engage the remainder of the sawcut springs.

4 Claims, 6 Drawing Figures

METHOD AND APPARATUS FOR CONTROLLING THERMAL GROWTH

BACKGROUND OF THE INVENTION

In devices such as high temperature turbomachines there is a very large temperature rise in going from the ambient temperature at which the device was assembled to its operating temperature. This temperature rise which can be 1000 °F., or more, causes thermal expansion of the components and presents centering problems in maintaining seals as well as the operating relationships between the various parts. In the case of a high temperature power recovery expander, for example, three different sets of expensive pin rings are employed to control radial expansion due to thermal growth and to maintain centering of the inlet casing, first stage stator and second stage stator.

SUMMARY OF THE INVENTION

In the present invention, pin rings are replaced by sawcut springs which are formed in the various casings of a turbomachine. Proximate pairs of axially extending sawcuts are made through the flanges and into the casings to form elongated tabs which define the sawcut springs of the present invention. The axial sawcuts provide both a centering and radial growth means for the inlet casings of a turbomachine. The inlet casing is centered at three points equally spaced about the circumference by means of jackscrews pressing against sawcut springs. As radial growth occurs, the springs deflect thereby maintaining centering without restricting the growth. Since a stator is generally made from materials with a different coefficient of expansion than other parts of the machine, this differential growth must be accounted for. This is also accomplished by the use of the same type of sawcut springs. The stator assemblies are attached at sufficient circumferential points on the sawcut flange to support the weight of the stator. These sawcut flange springs permit the stator to grow radially without loss of centering or stress buildup.

It is an object of this invention to provide a method and apparatus for controlling thermal growth.

It is a further object of this invention to provide a means for maintaining a seal in the presence of thermal growth.

It is an additional object of this invention to provide a means for preventing localized axial movement while permitting radial growth and the maintaining of a seal. These objects, and others as will become apparent hereinafter, are accomplished by the present invention.

Basically, according to the present invention, spring members are formed in the flange and adjacent casing section of a turbomachine. The casing assembly members are secured together at the locations of a sufficient number of the spring members to support the weight of the casing. Since the spring members are the most responsive members to differential thermal growth, the thermal growth takes place by flexure of the spring members while maintaining the relative axial positions of the assembly members. Additionally, other spring members are in face contact with the adjacent assembly member and are engaged by jackscrews which keep the assembly members centered.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENTS

Figure 1:
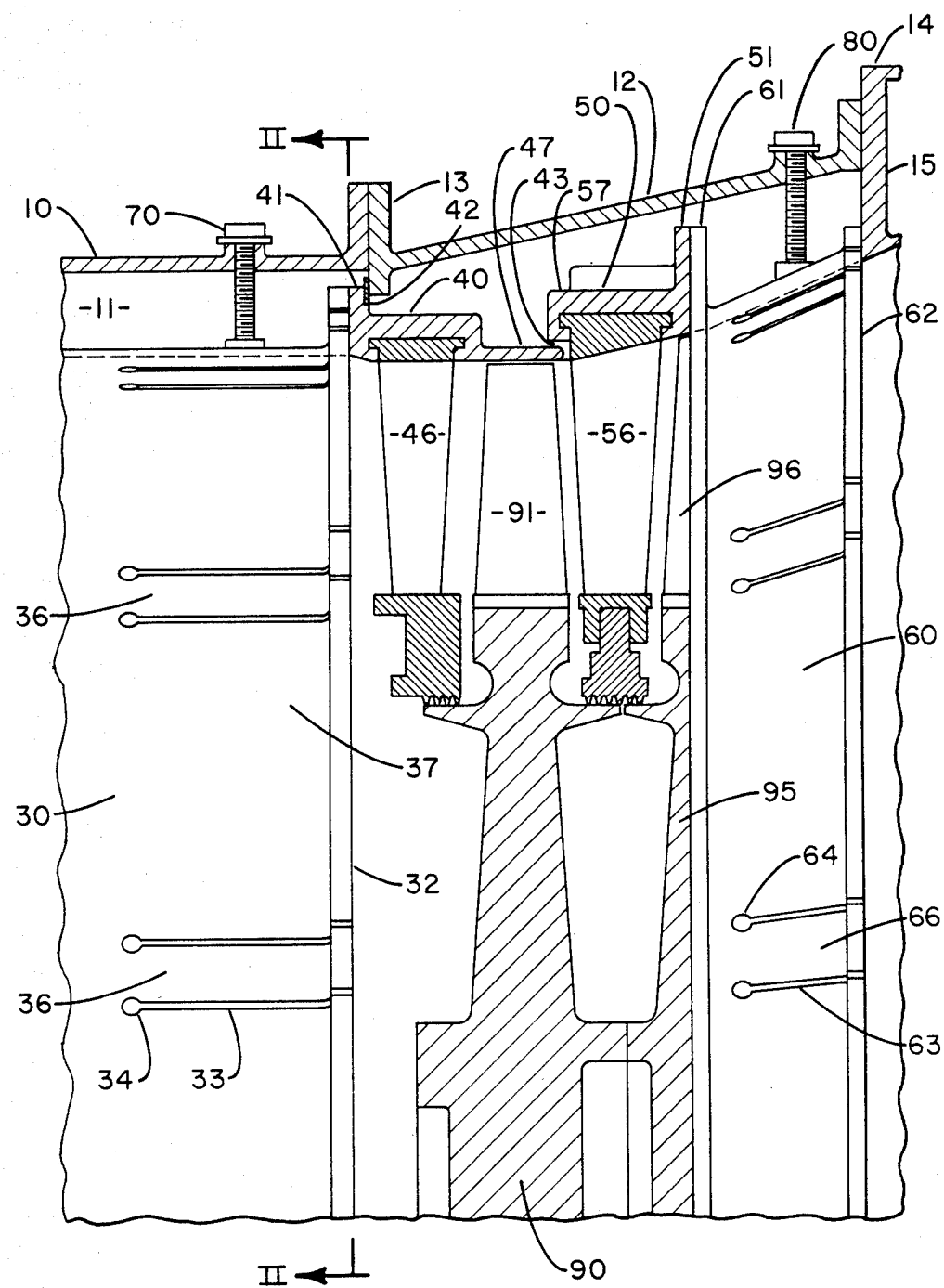
FIG. 1 is a partial sectional view of a turbomachine employing the present invention.
Figure 3:
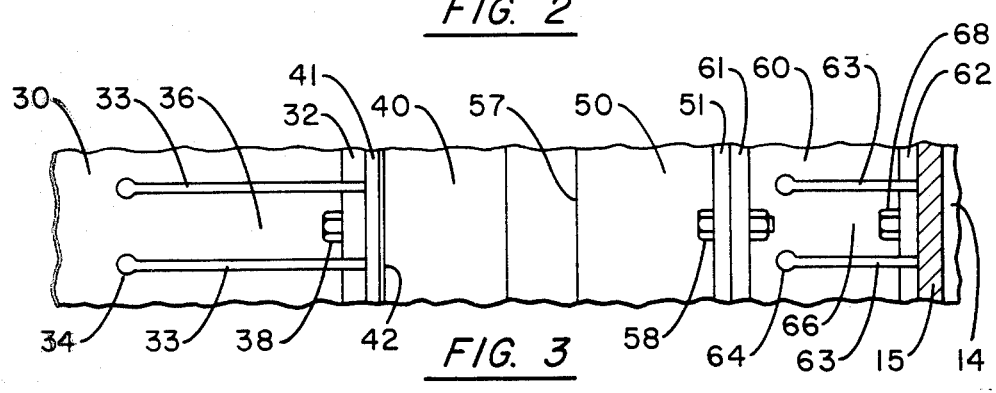
FIG. 3 is a partial view showing the details of the sawcut springs accommodating thermal growth.

In FIG. 1, the numerals 10, 12 and 14 designate respective sections of the outer casing of a high temperature power recovery expander which are suitably secured together by bolts or the like (not illustrated). Inside the outer casing formed by sections 10, 12 and 14 is an inlet casing 30, a first stage stator ring 40, a second stage stator ring 50 and an exhaust diffuser cone 60 which are suitably secured by bolts or the like, as illustrating in FIG. 3. Outer casing section 10 is separated from inlet casing 30 to form annular chamber 11 which is either filled with insulation or forms part of a flowpath for steam which is used to cool casing section 10. Flange 32 of the inlet casing has a plurality of pairs of proximate, axially extending sawcuts 33 and 33', respectively, which extend into the casing 30 and terminate in drilled holes 34 and 34' which reduce stress. Each pair of proximate sawcuts 33 and 33' results in an elongated tab which defines a sawcut spring 36 and 36', respectively. Flange 32 of the inlet casing 30 is secured to first stage stator ring 40 by a series of circumferentially spaced bolts 38 which are located on each of the sawcut springs 36, as best shown in FIG. 3. Flange 41 of first stage stator ring 40 carries annular seal 42 which seats against flange 13 of casing section 12 to form a gas seal and provide a load surface for axial thrust. Second stage stator ring 50 is radially spaced from first stage stator ring 40 by stator clearance gap 43 and flange 51 is secured to flange 61 of exhaust diffuser cone 60 by a plurality of circumferentially spaced bolts 58, as shown in FIG. 3. Flange 62 of exhaust diffuser cone 60 has a plurality of pairs of proximate, axially extending sawcuts 63 and 63' which extend into the cone 60 and terminate in drilled holes 64 and 64' which reduce stress. Each pair of proximate sawcuts 63 and 63' results in an elongated tab which defines a sawcut spring 66 and 66', respectively. Flange 62 of exhaust diffuser cone 60 is secured to flange 15 of casing section 14 by a series of circumferentially spaced bolts 68 which are located on each of the sawcut springs 66, as shown in FIG. 3.

Figure 2:
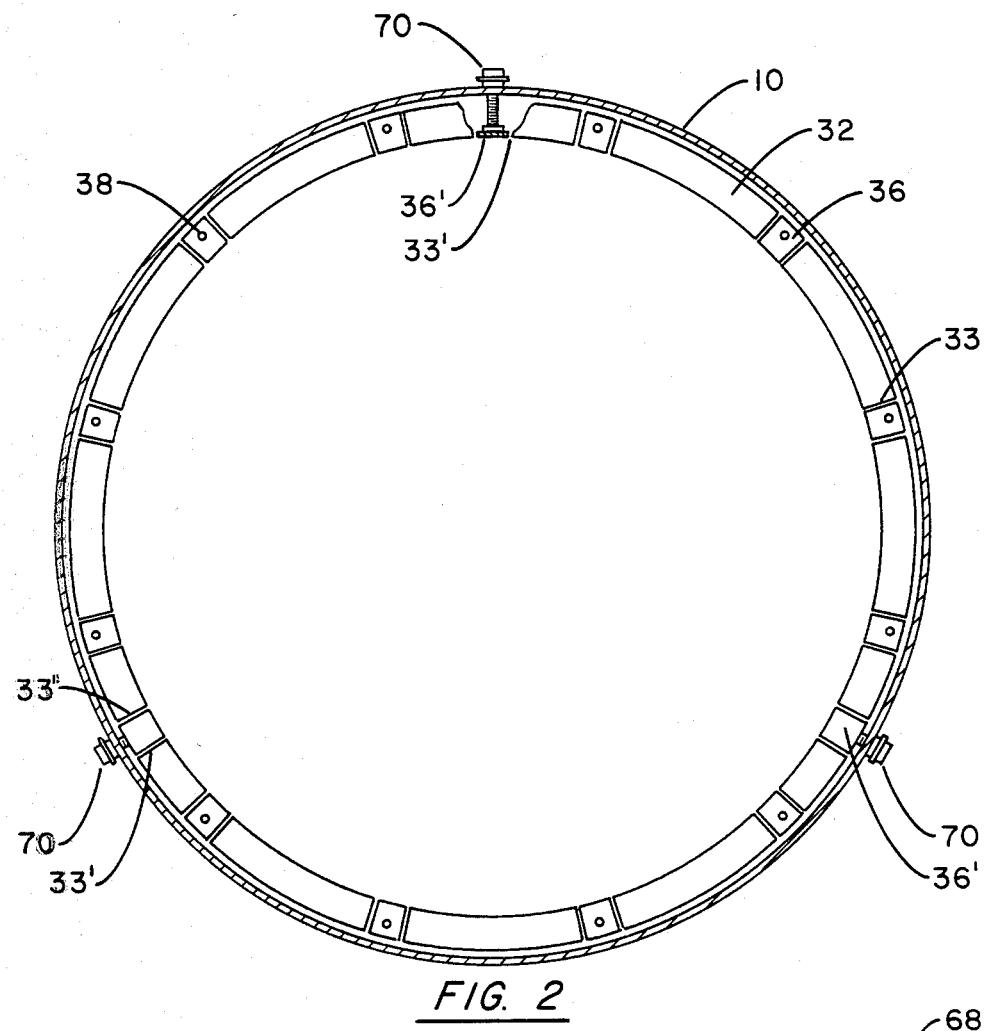
FIG. 2 is a sectional view taken along line 2—2 of FIG. 1.

As is best shown in FIG. 2, three jackscrews 70 spaced at 120° intervals engage respective sawcut springs 36' and serve as centering screws for inlet casing 30 and first stage stator ring 40. Similarly, three jackscrews 80 are spaced at 120° intervals about exhaust diffuser cone 60 and engage three sawcut springs 66' and serve as centering screws for second stage stator ring 50 and exhaust diffuser cone 60. It will be noted that springs 36' and 66' are not bolted at the flange but, rather, have face contact or a friction seal with the adjacent flanges 41 and 15, respectively.

Figure 4:
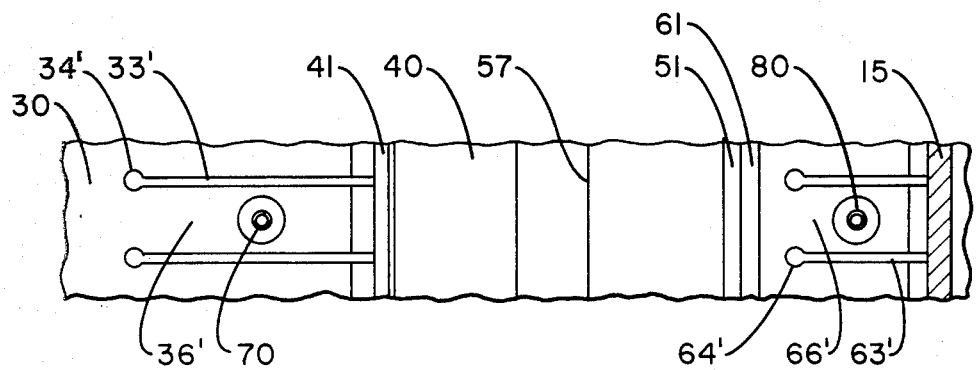
FIG. 4 is a partial view showing the details of sawcut springs serving a centering function.

From the foregoing description, it is clear that inlet casing 30 and first stage stator ring 40 form a unit which is held in a centered position by jackscrews 70. Seal 42 seats on flange 13 of casing section 12 to provide a gas seal and in addition hot gas passing from inlet casing 30 provides an axial thrust to first stage stator ring 40 in passing between blades 46 so that flange 13 also acts as a load surface for axial thrust. The hot gas also results in thermal expansion of the members. The downstream end 47 of the first stage stator ring 40 is free to expand axially since it is separated from second stage stator ring 50 by gap 43. Axial growth of inlet casing 30 is restrained by flange 13. Since flange 32 of inlet casing 30 and flange 41 of first stage stator ring 40 are bolted together by circumferentially spaced bolts 38 at sawcut springs 36, they undergo thermal radial growth as a unit. The sawcut springs 36 provide a radial growth means in that as differential radial growth occurs, the springs 36 deflect thereby maintaining centering without restricting the growth. The springs 36' which are contacted by jackscrews 70, as shown in FIG. 4, are also free to deflect but the load point is at the jackscrews 70. The portions 37 which are between springs 36 can thermally expand into the sawcuts 33 and can deflect to a lesser degree than springs 36 but because they do not have to accommodate the differential thermal growth of first stage stator ring 40, the lesser degree of deflection is adequate. The hot gas passing through first stage stator ring 40 passes between the blades 91 of rotor 90 and causes rotor 90 to rotate before passing to a second stage stator ring 50.

Second stage stator ring 50 and exhaust diffuser cone 60 are bolted together at their respective flanges 51 and 61 by circumferentially spaced bolts 58 to form a unit. The resulting unit is secured at flange 62 of diffuser cone 60 to flange 15 of casing section 14 by circumferentially spaced bolts 68 located on sawcut springs 66 and is held in a centered position by jackscrews 80 which engage springs 66'. Hot gas results in thermal expansion of the members. The upstream end 57 of second stage stator ring 50 is free to expand axially in combination with the exhaust diffuser cone 60 since it is separated from first stage stator ring 40 by gap 43. The hot gas passing between blades 56 of second stage stator ring 50 provides an axial thrust to the second stage stator ring 50 which is passed through exhaust diffuser cone 60 to flange 15 of the casing section 14 which acts as a load bearing member for axial thrust imparted to stator ring 50. Since flanges 51 and 61 are bolted together so that second stage stator ring 50 and exhaust diffuser cone 60 form a unit, they undergo thermal radial growth as a unit. End 57 provides free axial growth, as noted above. However, sawcut springs 66 provide a differential radial growth means in that as differential radial growth occurs, the springs 66 and 66' deflect thereby maintaining centering without restricting the growth. Springs 66 and 66' differ in their operation from springs 36 in that deflection of springs 66 and 66' takes place with flange 62 being the relatively fixed end rather than the relatively movable end as is the case with flange 32. Jackscrews 80, like jackscrews 70, change the deflection or loading point of their respective springs 66' while maintaining ring 50 and exhaust diffuser cone 60 centered. The gas passing through second stage stator ring 50 passes between the blades 96 of rotor 95 and cause rotor 95 to rotate as a unit with rotor 90, as is conventional, before passing through exhaust diffuser cone 60 and on to exhaust.

Figure 5:
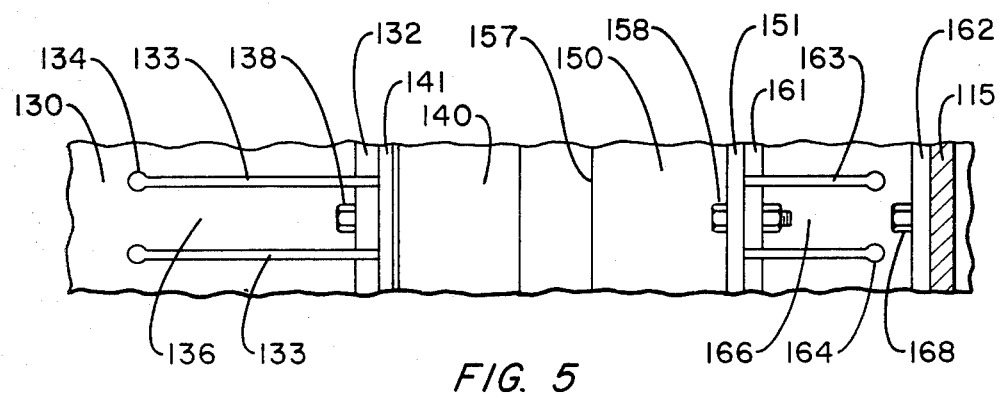
FIG. 5 is a partial view showing the details of modified sawcut springs accommodating thermal growth.
Figure 6:
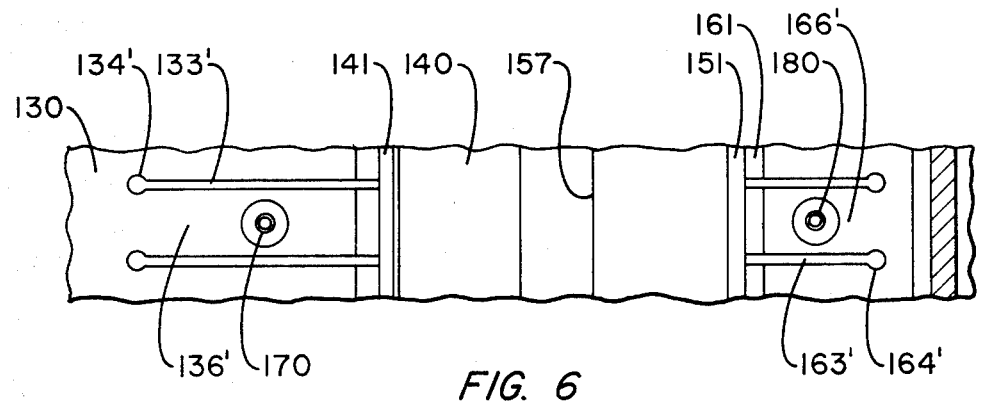
FIG. 6 is a partial view showing the details of the modified sawcut springs serving a centering function.

FIGS. 5 and 6 illustrate a modified device in which all corresponding structure is numbered 100 higher in which springs 66 and 66' have been replaced by springs 166 and 166' which are cut into flange 161 rather than flange 162. As a result, the thermal expansion is accommodated between members 150 and 160 rather than members 60 and 14 as is the case in the device of FIGS. 1–4, but is otherwise identical to the device of FIGS. 1–4.

It follows then that in the present invention supported members held in a centered position are free to undergo differential thermal expansion without loss of centering. This is achieved by providing sawcut springs such that the supported structure is free to flex at the point of support so that centering is maintained even though differential thermal expansion takes place.

Although preferred embodiments of the present invention have been illustrated and described, other changes will occur to those skilled in the art. For example the location, number and spacing of the bolted springs and those engaged by jackscrews may be varied to accommodate specific design requirements. It is therefore intended that the scope of the present invention is to be limited only by the scope of the appended claims.

What is claimed is:

1. A method for securing a flanged member at the flange to a second member such as to accommodate differential thermal growth between the flanged and the second member including the steps of:
   providing a plurality of proximate pairs of sawcuts through the flange and into the flanged member to form a plurality of sawcut springs; and
   securing the flanged member to the second member at the locations of the flange portions of the sawcut springs whereby differential thermal expansion between the flanged member and the second member is accommodated by deflection of the spring member.

2. The method of claim 1 further including the step of centering the flanged member by means of a plurality of supports engaging additional spring members whereby the flanged member and the second member secured thereto remain centered even though subject to differential thermal expansion.

3. Apparatus for controlling differential thermal growth comprising:
   a first member;
   a second member having a casing with a flange thereon;
   a plurality of pairs of proximate sawcuts in said flange and extending into said casing to define a plurality of spring members;
   means for securing the flange portions of said springs to said first member whereby differential thermal growth between said first and second members will cause deflections of said spring members.

4. The apparatus of claim 3 further comprising:
   a plurality of additional pairs of proximate sawcuts in said flange and extending into said casing to define a plurality of additional spring members;
   a plurality of centering means engaging said additional spring members at a distance from the flange portions whereby said first and second members are maintained centered even though subject to differential thermal expansion.

* * * * *